(12) United States Patent
Moir et al.

(10) Patent No.: US 8,506,855 B2
(45) Date of Patent: Aug. 13, 2013

(54) MOLTEN SALT FUELS WITH HIGH PLUTONIUM SOLUBILITY

(75) Inventors: Ralph W. Moir, Livermore, CA (US); Patrice E. A. Turchi, Menlo Park, CA (US); Henry F. Shaw, San Ramon, CA (US); Larry Kaufman, Brookline, MA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 395 days.

(21) Appl. No.: 12/888,704

(22) Filed: Sep. 23, 2010

(65) Prior Publication Data
US 2011/0108783 A1 May 12, 2011

Related U.S. Application Data

(60) Provisional application No. 61/245,578, filed on Sep. 24, 2009.

(51) Int. Cl.
| | |
|---|---|
| *G21G 4/00* | (2006.01) |
| *C01G 43/06* | (2006.01) |
| *C01G 56/00* | (2006.01) |
| *G21C 1/22* | (2006.01) |

(52) U.S. Cl.
USPC ........... 252/640; 252/636; 252/637; 423/251; 423/252; 423/253; 423/254; 423/259; 376/359; 376/360; 376/901

(58) Field of Classification Search
USPC ................ 252/637, 638, 639, 640; 423/251, 423/252, 259; 376/901, 359, 360
See application file for complete search history.

(56) References Cited

U.S. PATENT DOCUMENTS

2009/0279658 A1* 11/2009 Leblanc ........................ 376/360
2011/0286563 A1* 11/2011 Moses et al. .................. 376/146

FOREIGN PATENT DOCUMENTS

WO    WO 2009058185 A2 * 5/2009

OTHER PUBLICATIONS

Moir et al. "Molten Salt Fuel Version of Laser Inertial Fusion Energy (LIFE)", Fusion Science and Technology, vol. 56, Aug. 2009, pp. 632-640.*
Moir et al. "LIFE Materails: Molten-Salt Fuels vol. 8", Lawrence Livermore National Laboratory Technical Report, Dec. 2008.*
Ubeyli, M. "Neutronic performance of HYLIFE-II fusion reactor using varios thormium molten salts", Annals of Nuclear Energy, 33, (2006), pp. 1417-1423.*
Khokhlov et al. "Evaluating physical properties of molten salt reactor fluoride mixtures", Journal of Fluorine Chemistry, 2009, 130, pp. 30-37 (available online Jul. 30, 2008).*
Delpech et al. "Reactor physic and reprocessing scheme for innovative molten salt reactor system", Journal of Fluorine Chemistry, 2009, 130, pp. 11-17 (available online Jul. 18, 2008).*
Shaffer, "Preparation and Handling of Salt Mixures for Molten Salt Reactor Experiment", Reactor Chemistry Division, G.J. Nessle and W. R. Grimes, Chem. Eng. Prog., Symp. Ser. 56(28), 51, 41 pages (1960).

* cited by examiner

*Primary Examiner* — Peter F Godenschwager
(74) *Attorney, Agent, or Firm* — Kilpatrick Townesend & Stockton

(57) ABSTRACT

The present invention includes a composition of LiF—ThF$_4$—UF$_4$—PuF$_3$ for use as a fuel in a nuclear engine.

17 Claims, 2 Drawing Sheets

(A)

(B)

| LiF (mol%) | ThF$_4$ (mol%) | UF$_4$ (mol%) | PuF$_3$ (mol%) | Th/(Th+U) |
|---|---|---|---|---|
| 76.0 | 24 | 0 | 0 | 1.000 |
| 76.5 | 21 | 3 | .5 | .875 |
| 75.0 | 18 | 6 | 1 | .750 |
| 74.5 | 15 | 9 | 1.5 | .625 |
| 74.25 | 13.5 | 10.5 | 1.75 | .5625 |
| 74.0 | 12 | 12 | 2 | .500 |
| 73.0 | 6 | 18 | 3 | .250 |
| 72.0 | 0 | 24 | 4 | .000 |

MOLTEN SALT FUELS WITH HIGH PLUTONIUM SOLUBILITY

CROSS-REFERENCES TO RELATED APPLICATIONS

This application claims priority to U.S. Provisional Application No. 61/245,578, filed Sep. 24, 2009, which is incorporated in its entirety herein for all purposes.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Projections by the Energy Information Agency and current Intergovernmental Panel on Climate Change (IPCC) expect worldwide electric power demand to double from its current level of about 2 terawatts electrical power (TWe) to 4 TWe by 2030, possibly reaching 8-10 TWe by 2100. They also expect that for the next 30 to 50 years, the bulk of the demand of electricity production will be provided by fossil fuels, typically coal and natural gas. Coal supplies 41% of the world's electric energy today, and is expected to supply 45% by 2030. In addition, the recent report from the IPCC has placed the likelihood that man-made sources of $CO_2$ emissions into the atmosphere are having a significant effect on the climate of planet earth at 90%. "Business as usual" baseline scenarios show that $CO_2$ emissions could be almost two and a half times the current level by 2050. More than ever before, new technologies and alternative sources of energy are essential to meet the increasing energy demand in both the developed and the developing worlds, while attempting to stabilize and reduce the concentration of $CO_2$ and other greenhouse gases in the atmosphere, and mitigate the concomitant climate change.

Nuclear energy, a non-greenhouse-gas emitting energy source, has been a key component of the world's energy production since the 1950's, and accounts for about 16% of the world's electricity production, a fraction that could—in principle—be increased. Several factors, however, make its long-term sustainability difficult. These concerns include the risk of proliferation of nuclear materials and technologies resulting from the nuclear fuel cycle; the generation of long-lived radioactive nuclear waste requiring burial in deep geological repositories; the current reliance on the once-through nuclear fuel cycle; and the availability of low-cost, low-$CO_2$-footprint uranium ore. In the United States alone, nuclear reactors have already generated more than 55,000 metric tons (MT) of spent nuclear fuel (SNF). In the near future, the US will have enough spent nuclear fuel to fill the proposed Yucca Mountain geological waste repository to its legislated limit of 70,000 MT.

Fusion is an attractive energy option for future power generation, with two main approaches to fusion power plants now being developed. In a first approach, Inertial Confinement Fusion (ICF) uses lasers, heavy ion beams, shock ignition, impulse ignition, pulsed power, or other techniques to rapidly compress capsules containing a mixture of isotopes of hydrogen, typically, deuterium (D) and tritium (T). As the capsule radius decreases and the DT gas density and temperature increase, DT fusion reactions are initiated in a small spot in the center of the compressed capsule. These DT fusion reactions generate both alpha particles and 14.1 MeV neutrons. A fusion burn front propagates from the spot, generating significant energy gain. A second approach, Magnetic Fusion Energy (MFE) uses powerful magnetic fields to confine a DT plasma and to generate the conditions required to sustain a burning plasma and generate energy gain.

Important technology for inertial confinement fusion is being developed at the National Ignition Facility (NIF) at Lawrence Livermore National Laboratory (LLNL) in Livermore, Calif. At LLNL, a laser-based inertial confinement fusion project designed to achieve thermonuclear fusion ignition and burn uses laser energies of 1 to 1.3 MJ. Fusion yields of the order of 10 to 20 MJ are expected. Fusion yields in excess of 200 MJ could be expected to be required in central-hot-spot fusion geometry if fusion technology, by itself, were to be used for cost-effective power generation. In order to reduce the demands on the magnitude of the fusion yield required for economically viable power generation, it should be possible to couple a fusion system to a fission system, creating a so-called "hybrid" engine. Such a system would use the neutrons produced by fusion to cause transmutation or fission of fertile or fissile nuclei in a region exposed to the fusion neutrons. The energy released by the fission reactions then multiplies the energy released by the fusion reactions, thereby achieving an overall level of power production (fusion+fission) that is economically viable.

LLNL has been studying a fusion system, the Laser Inertial-confinement Fusion Energy (LIFE) engine that could be the fusion portion of a hybrid energy system. It is possible that hybrid LIFE power plants could be introduced into the U.S. economy before 2030. At present, the U.S. supply of depleted uranium (DU) is approximately 550,000 tons. If burned in hybrid LIFE systems as described herein, this would generate approximately 550 TWe-yrs of power. If estimates that the total U.S. electricity demand could reach about 2 TWe by 2100 are accurate, the current stockpile of DU alone could supply the total U.S. electric demand for nearly 300 years. In addition, a significant advantage afforded by the combination of fusion and fission, is that a hybrid LIFE system could potentially burn existing and future inventories of spent nuclear fuel (SNF) from light water reactors (LWRs). At present, in the U.S. alone, the current inventory of SNF in temporary storage at reactor sites is roughly 55,000 MT.

In addition to the U.S. scenarios described above, LIFE technology offers an attractive pathway for the expansion of nuclear power around the world. Proliferation concerns are mitigated compared to other nuclear technologies, and nuclear fuel for hybrid LIFE systems is inexpensive and widely available. Moreover, because a hybrid LIFE system employs a self-contained, closed fuel cycle, and it burns its fuel to the point where the actinide content of the spent fuel is less than 1% of its original content, nuclear waste repository considerations are simplified, particularly for countries not willing to build such underground repositories.

The hybrid fission-fusion engines described above can use either solid fuels or molten salt fuels for the fission portion of the system. The potential use of molten salts as fuels for the hybrid LIFE system, however, places certain demands on the melting temperature of the fuel, the nuclear properties of the fuel, the chemical stability of the fuel, the solubility of fissile and fertile materials in the fuel, and compatibility of the fuel with structural materials. Thus, there is a need in the art for improved molten salt fuels suitable for use in the hybrid LIFE systems. Surprisingly, the present invention meets these and other needs.

BRIEF SUMMARY OF THE INVENTION

In one embodiment, the present invention provides a composition including LiF, $UF_4$, $ThF_4$, and $PuF_3$, wherein the $UF_4$ and $ThF_4$ are present in a mole fraction of from about 20 to about 30% of the composition, and wherein the composition is molten at a temperature of between about 475° C. and about 575° C.

BRIEF DESCRIPTION OF THE DRAWINGS

FIG. 1 displays the 22% mole fraction sample as 0.22 (the top line at 0.625 for $ThF_4/(ThF_4+UF_4)$), the 24% sample as 0.24 (the bottom line at 0.625) and the 26% sample as 0.26 (the middle line at 0.625). At a mole fraction ratio of 0.625 for $ThF_4/(ThF_4+UF_4)$, the molten salt having a mole fraction sum for $ThF_4$ and $UF_4$ of 24%, the melting point for the molten salt is about 520° C. At a mole fraction sum of 26% for $ThF_4$ and $UF_4$, the lowest melting point for the molten salt is about 535° C. At a mole fraction sum of 22% for $ThF_4$ and $UF_4$, the lowest melting point for the molten salt is about 560° C.

DETAILED DESCRIPTION OF THE INVENTION

Figure 1:
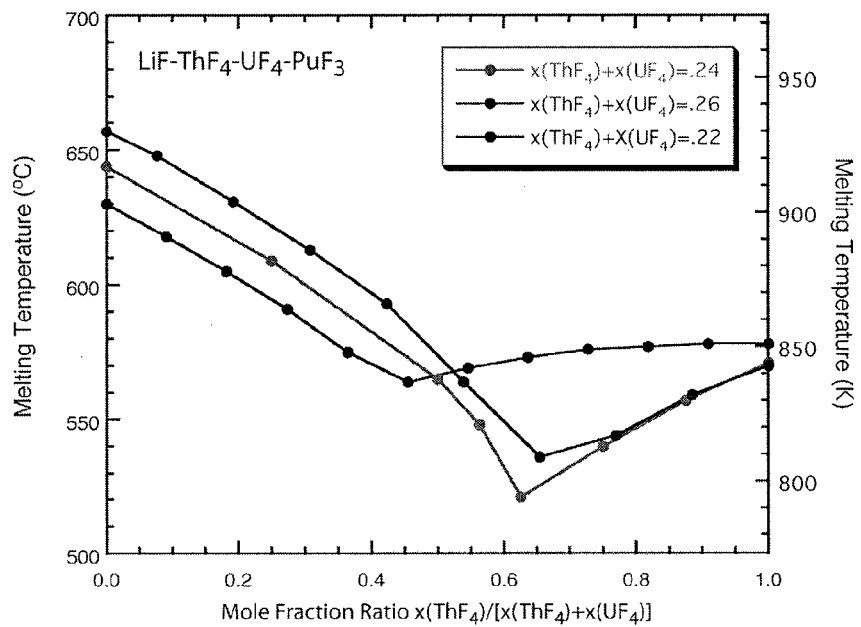
FIG. 1 shows a graph of the melting temperature versus the mole fraction ratio of $ThF_4/(ThF_4+UF_4)$ of the LiF—$UF_4$—$ThF_4$—$PuF_3$ molten salt with three different values for the sum of the mole fractions of $ThF_4$ and $UF_4$, namely 22%, 24%, and 26%.
Figure 2:
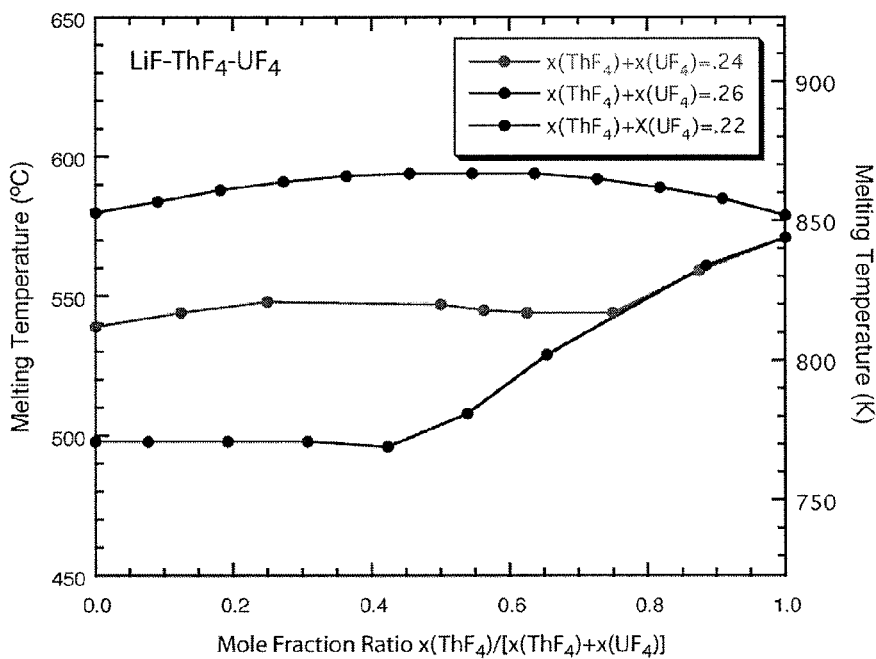
FIG. 2 shows the melting temperature of a LiF—$UF_4$—$ThF_4$ molten salt as a function of the mole fraction ratio of $ThF_4/(ThF_4+UF_4)$ for three different values for the sum of the mole fractions of $ThF_4$ and $UF_4$, namely 22% (the top line), 24% (the middle line), and 26% (the bottom line).
Figure 3:
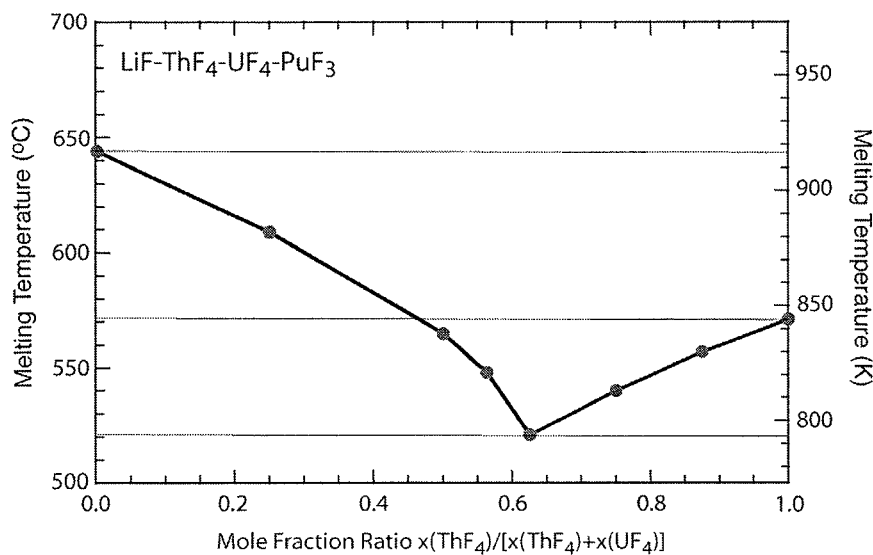
FIGS. 3A and 3B show the salt defined by $x(ThF_4)+x(UF_4)=0.24$ provides the lowest melting point when the mole fraction of $ThF_4$ is about 15% and the mole fraction of $UF_4$ is about 9% (i.e., $x(ThF_4)/x(ThF_4)+x(UF_4)=0.625$). For this molten salt formulation, the melting point is 520° C. at 15 mol % $ThF_4$, 9 mol % $UF_4$, and 1.5 mol % $PuF_3$, with a balance of 74.5 mol % LiF.

According to the present invention, techniques related to molten salt fuels are provided. More particularly, an embodiment of the present invention provides a molten salt fuel including LiF, $ThF_4$, $UF_4$, and $PuF_3$, that is molten at a temperature of between about 475° C. and about 575° C. The compositions of the present invention are useful as a fuel in any suitable nuclear system. Nuclear systems that can use molten salt fuels include, but are not limited to: critical and subcritical fission reactor systems such as molten-salt-fueled reactors, advanced "Generation IV" fission reactors, integral fast reactors; hybrid fusion-fission systems such as hybrid fusion-fission LIFE systems, other hybrid fission-fusion systems involving inertial-confinement fusion, and hybrid magnetic-confinement fission-fusion energy (MFE) systems; accelerator-driven nuclear systems; and any other application in which actinides are present in a high-temperature fluid. In some embodiments, the nuclear system is a hybrid version of the Laser Inertial-confinement Fusion Energy (LIFE) engine, such as described in International Patent Application No. PCT/US2008/011335, entitled "Control of a Laser Inertial Confinement Fusion-Fission Power Plant", the disclosure of which is hereby incorporated by reference in its entirety for all purposes.

In a hybrid LIFE system, the point source of fusion neutrons acts as a catalyst to drive the fission blanket, which obviates the need for a critical assembly to sustain the fission chain reaction. Starting from as little as 300 to 500 megawatts of fusion power (MWf), a single LIFE engine can generate 2000 to 3000 megawatts of thermal power (MWt) in steady state for periods of years to decades, depending on the fuel and engine configuration. Because neutrons are provided by the fusion targets, such as in a LIFE engine, the fission blanket in a hybrid fusion-fission system, such as a hybrid LIFE system, is subcritical. This enables the hybrid LIFE system to burn any fertile or fissile nuclear material, including un-enriched, natural or depleted uranium and spent nuclear fuel (SNF), and to extract virtually 100% of the energy content of its fuel. This results in greatly enhanced energy generation per metric ton of nuclear fuel, and reduces the amount of nuclear waste. Even the resulting waste has reduced concentrations of long-lived actinides. Hybrid LIFE systems could provide large amounts of electricity while reducing the actinide content of existing and future nuclear waste, thereby extending the availability of low-cost nuclear fuels for thousands of years. Hybrid LIFE systems also provide a pathway for burning excess weapons grade plutonium (Pu) to over 99% Fission of the Initial Metal Atoms (FIMA) without need for fabricating or reprocessing mixed oxide fuels.

The present invention provides a molten salt fuel including LiF, $ThF_4$, $UF_4$, and $PuF_3$, for use in a nuclear engine. Although molten salts have previously been used for cooling nuclear engines as well as fuels, the introduction of plutonium as a fuel constituent presents difficulties due to the limited solubility of Pu in such salts at the operating temperature. This raises the possibility of precipitation of plutonium in the cooler parts of the system, leading to the potential for accumulation of a critical mass. The molten salt fuels of the present invention, however, have a low melting point and reasonably high solubility of Pu at the operating temperatures of the engine (about 610 to 650° C.), thereby allowing the salt fuel to remain molten and avoiding the precipitation issues. Pu will be produced by neutron-capture on uranium in any $^{238}$U-containing fuel (e.g., DU), and is present in SNF. Use of these materials as a fission fuel in a hybrid LIFE system will result in the presence of Pu in the molten salt fuel. Furthermore, a large percentage of the fissions of uranium or plutonium end up producing a lanthanide element (atomic number 57 to 71) fission fragment. In molten salts, these elements have chemical properties very similar to $Pu^{3+}$, and form a mixed lanthanide plus plutonium trifluoride solid solution. The low solubility of Pu is therefore exacerbated by the production of lanthanide fission products.

As shown in FIG. 1, when the ratio of $ThF_4/(ThF_4+UF_4)$ is about 0.625 and the sum of the mole fraction for $ThF_4$ and $UF_4$ is about 24% ($ThF_4$ is about 15% and $UF_4$ is about 9%; displayed as 0.24), and the composition includes a mole fraction of $PuF_3$ of about 1.5%, the melting temperature of the LiF—$ThF_4$—$UF_4$—$PuF_3$ salt is about 520° C., below the operating temperature of the engine. Thus, the composition of the present invention includes the plutonium fuel component and avoids the precipitation issues of other systems, allowing the composition to be used as a molten salt fuel in a nuclear engine.

As used herein, the term "mole fraction" refers to the fraction of one substance of a composition, as measured by the moles of the substance, divided by the total number of moles in the composition, and displayed as a percentage.

As used herein, the term "molten" refers to a solid that has melted completely.

The composition of the present invention includes salts of Li, Th, U, and Pu. The composition can include other components. The salts of Li, Th, U, and Pu can have any suitable counterion. Some suitable counterions include, but are not limited to, F and Cl. In some embodiments, the counterion is F.

The elements Li, Th, U and Pu of the salts of the present invention can adopt any suitable oxidation state. For example, U can be +3 or +4, and Pu can be +3 or +4.

The composition of the present invention can be molten at any suitable temperature. For example, the composition can be molten at a temperature of between about 400° C. and about 600° C. In some embodiments, the composition can be molten at a temperature of between about 475° C. and about 575° C. In other embodiments, the composition can be molten at a temperature of between about 500° C. and about 550° C. In some other embodiments, the composition can be molten at a temperature of about 550, 540, 530, 520, 510 or 500° C. In still other embodiments, the composition can be molten at a temperature of about 520° C.

In some embodiments, the present invention provides a composition of $LiF$, $UF_4$, $ThF_4$, and $PuF_3$, wherein the $UF_4$ and $ThF_4$ are present in a mole fraction of from about 20 to about 30% of the composition, and wherein the composition is molten at a temperature of between about 475° C. and about 575° C.

The LiF component can be present in the composition in any suitable mole fraction. In some embodiments, the LiF can be present in a mole fraction of from about 50 to about 90% of the composition. In other embodiments, the LiF can be present in a mole fraction of from about 70 to about 80% of the composition. In some other embodiments, the LiF can be present in a mole fraction of from about 72 to about 77% of the composition, such as 72, 73, 74, 75, 76 or 77% of the composition. In still other embodiments, the LiF can be present in a mole fraction of about 74.1, 74.2, 74.3, 74.4, 74.5, 74.6, 74.7, 74.8 or about 74.9% of the composition. In still yet other embodiments, the LiF can be present in a mole fraction of about 74.5% of the composition.

The $UF_4$ component can be present in the composition in any suitable mole fraction. In some embodiments, the $UF_4$ can be present in a mole fraction of from about 0.01 to about 50% of the composition. In other embodiments, the $UF_4$ can be present in a mole fraction of from about 0.1 to about 24% of the composition. In some other embodiments, the $UF_4$ can be present in a mole fraction of from about 6 to about 12% of the composition, such as about 6, 7, 8, 9, 10, 11 or 12% of the composition. In still other embodiments, the $UF_4$ can be present in a mole fraction of about 9% of the composition.

The $ThF_4$ component can be present in the composition in any suitable mole fraction. In some embodiments, the $ThF_4$ can be present in a mole fraction of from about 0.01 to about 50% of the composition. In other embodiments, the $ThF_4$ can be present in a mole fraction of from about 0.1 to about 24% of the composition. In some other embodiments, the $ThF_4$ can be present in a mole fraction of from about 12 to about 18% of the composition, such as about 12, 13, 14, 15, 16, 17 or 18% of the composition. In still other embodiments, the $ThF_4$ can be present in a mole fraction of about 15% of the composition.

The $UF_4$ and $ThF_4$ components can together be present in any suitable mole fraction. In some embodiments, the $UF_4$ and $ThF_4$ can be present in a mole fraction of from about 0.1 to about 50% of the composition. In other embodiments, the $UF_4$ and $ThF_4$ can be present in a mole fraction of from about 20 and to about 30% of the composition, such as about 20, 21, 22, 23, 24, 25, 26, 27, 28, 29 or 30% of the composition. In some other embodiments, the $UF_4$ and $ThF_4$ can be present in a mole fraction of from about 22 to about 26% of the composition. In still other embodiments, the $UF_4$ and $ThF_4$ can be present in a mole fraction of about 24% of the composition.

The $PuF_3$ component can be present in the composition in any suitable mole fraction. In some embodiments, the $PuF_3$ is present in a mole fraction of from about 0.01 to about 10% of the composition. In other embodiments, the $PuF_3$ is present in a mole fraction of from about 0.1 to about 5% of the composition. In some other embodiments, the $PuF_3$ is present in a mole fraction of from about 1 to about 2% of the composition. In still other embodiments, the $PuF_3$ is present in a mole fraction of about 1.1, 1.2, 1.3, 1.4, 1.5, 1.6, 1.7, 1.8, 1.9 or 2.0% of the composition. In yet other embodiments, the $PuF_3$ is present in a mole fraction of about 1.5%. The plutonium can be obtained from any suitable source, such as spent nuclear fuel, or excess weapons grade plutonium.

In some embodiments, the composition includes LiF in a mole fraction of about 74.5% of the composition, $UF_4$ in a mole fraction of about 9% of the composition, $ThF_4$ in a mole fraction of about 15% of the composition, and $PuF_3$ in a mole fraction of about 1.5% of the composition, wherein the composition is molten at a temperature of about 520° C.

Other components useful in the composition of the present invention include, but are not limited to those elements produced by the fission of Th, U, and Pu, elements produced by neutron-induced transmutation of Th, U, and Pu and their fission products, as well as those elements produced in the nuclear decay chains of Th, U, and Pu. These elements will be produced by irradiation of the molten salts of the present invention by neutrons in a fission system, and are present in SNF. The elements produced by the fission of Th, U and Pu include, but are not limited to, Ga, Ge, As, Se, Br, Kr, Rb, Sr, Y, Zr, Nb, Mo, Tc, Ru, Rh, Pd, Ag, Cd, In, Sn, Sb, Te, I, Xe, Cs, Ba, La, Ce, Pr, Nd, Pm, Sm, Eu, Gd, Tb, Dy, Ho, and Er. Elements produced by the transmutation of U, Pu, and Th include, but are not limited to, Pa, Np, Am, Cm, Bk, Cf, and Es. The SNF is considered a potential source of U, Pu, and other transuranic elements, such as Am, Cm, and Np, for use in a hybrid fission-fusion system.

The compositions of the present invention can be prepared by a variety of methods known to one of skill in the art, see Shaffer, J. H. (1971), "Preparation and Handling of Salt Mixtures for the Molten Salt Reactor Experiment" (ORNL-4616), Oak Ridge National Laboratory, U.S. (published January 1971), incorporated herein by reference in its entirety.

The present invention also provides a fuel including salts of Li, Th, U, and Pu. The fuel can include other components. In some embodiments, the fuel includes the compositions of the present invention, as described above.

I. EXAMPLES

Example 1

Preparation of $LiF$—$UF_4$—$ThF_4$—$PuF_3$

The molten salt fuel can be prepared by first preparing the $LiF$—$UF_4$—$ThF_4$ salt according to the procedures in Shaffer, J. H. (1971), "Preparation and Handling of Salt Mixtures for the Molten Salt Reactor Experiment" (ORNL-4616), Oak Ridge National Laboratory, U.S. (published January 1971). $ThF_4$ can be purchased commercially or produced by hydrofluorination of Th oxide or metal. The plutonium fuel is then provided as follows.

Excess weapons plutonium, which requires no preprocessing, is converted to the trifluoride by hydrofluorination in the presence of a small amount of hydrogen (i.e., probably <2% $H_2$) in the temperature range 500-600° C. The hydrogen prevents the formation of the tetrafluoride and the volatile hexafluoride. The $PuF_3$ is mixed with LiF in the ratio 19.5 mol % $PuF_3$-80.5 mol % $^7LiF$ and heated above the eutectic temperature of 743° C. The mixture is cooled and stored for later use or injected in the fuel salt. If the mixture is cooled and stored for later use, several schemes exist for introduction into the fission blanket. For example, the mixture can be preheated to 750° C. and the liquid blended with the fuel salt, or small pellets of the eutectic mixture can be added to the fuel salt in a suitable reservoir, where it can dissolve into the fuel salt. Fail-safe procedures can be implemented to guard against the introduction of excess reactivity at this point in the process.

In general, the processing equipment that is required for the plutonium feed material preparation consists of controlled-atmosphere gloveboxes that are fitted with furnace systems and nickel reaction chambers that are fitted with gas-handling capabilities. Criticality safety issues are important during all stages of the design.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference.

What is claimed is:

1. A composition comprising LiF, $UF_4$, $ThF_4$, and $PuF_3$, wherein the $UF_4$ and $ThF_4$ are together present in a mole fraction of from about 20 to about 30% of the composition, and wherein the composition is molten at a temperature of between about 475° C. and about 575° C.

2. The composition of claim 1, wherein the LiF is present in a mole fraction of from about 70 to about 80% of the composition.

3. The composition of claim 1, wherein the LiF is present in a mole fraction of from about 72 to about 77% of the composition.

4. The composition of claim 1, wherein the LiF is present in a mole fraction of about 74.5% of the composition.

5. The composition of claim 1, wherein the $UF_4$ is present in a mole fraction of from about 0.1 to about 24% of the composition.

6. The composition of claim 1, wherein the $UF_4$ is present in a mole fraction of from about 6 to about 12% of the composition.

7. The composition of claim 1, wherein the $UF_4$ is present in a mole fraction of about 9% of the composition.

8. The composition of claim 1, wherein the $ThF_4$ is present in a mole fraction of from about 0.1 to about 24% of the composition.

9. The composition of claim 1, wherein the $ThF_4$ is present in a mole fraction of from about 12 to about 18% of the composition.

10. The composition of claim 1, wherein the $ThF_4$ is present in a mole fraction of about 15% of the composition.

11. The composition of claim 1, wherein the $UF_4$ and $ThF_4$ are together present in a mole fraction of from about 22 to about 26% of the composition.

12. The composition of claim 1, wherein the $UF_4$ and $ThF_4$ are together present in a mole fraction of about 24% of the composition.

13. The composition of claim 1, wherein the $PuF_3$ is present in a mole fraction of from about 0.1 to about 5% of the composition.

14. The composition of claim 1, wherein the $PuF_3$ is present in a mole fraction of from about 1 to about 2% of the composition.

15. The composition of claim 1, wherein the composition is molten at a temperature of between about 500° C. and about 550° C.

16. The composition of claim 1, wherein the composition is molten at a temperature of about 520° C.

17. The composition of claim 1, wherein
the LiF is present in a mole fraction of about 74.5% of the composition;
the $UF_4$ is present in a mole fraction of about 9% of the composition;
the $ThF_4$ is present in a mole fraction of about 15% of the composition; and
the $PuF_3$ is present in a mole fraction of about 1.5% of the composition, wherein the composition is molten at a temperature of about 520° C.

* * * * *